US012596296B2

(12) United States Patent
Graves et al.

(10) Patent No.: US 12,596,296 B2
(45) Date of Patent: Apr. 7, 2026

(54) DISPLAY SCREEN

(71) Applicant: Prysm Systems, Inc., Milpitas, CA (US)

(72) Inventors: Robert L. Graves, Methuen, MA (US); Roger A. Hajjar, San Jose, CA (US); Michael P. Mcmahon, Holden, MA (US); Philip J. Ralli, Maynard, MA (US)

(73) Assignee: Prysm Systems, Inc., Milpitas, CA (US)

( * ) Notice: Subject to any disclaimer, the term of this patent is extended or adjusted under 35 U.S.C. 154(b) by 184 days.

(21) Appl. No.: 18/420,251

(22) Filed: Jan. 23, 2024

(65) Prior Publication Data

US 2024/0329512 A1 Oct. 3, 2024

Related U.S. Application Data

(60) Provisional application No. 63/492,262, filed on Mar. 27, 2023.

(51) Int. Cl.
| | |
|---|---|
| *G03B 21/60* | (2014.01) |
| *G02F 1/1335* | (2006.01) |
| *H04N 9/31* | (2006.01) |

(52) U.S. Cl.
CPC ........ *G03B 21/60* (2013.01); *G02F 1/133614* (2021.01); *H04N 9/3129* (2013.01)

(58) Field of Classification Search
CPC ...... H04N 13/324; H04N 9/3129; G09G 3/02; G03B 21/204; G02F 1/133614
See application file for complete search history.

(56) References Cited

U.S. PATENT DOCUMENTS

| | | | | |
|---|---|---|---|---|
| 8,809,811 | B2 * | 8/2014 | Ralli | G03B 21/60 |
| | | | | 250/488.1 |
| 2007/0188417 | A1 * | 8/2007 | Hajjar | G09G 3/02 |
| | | | | 345/75.1 |
| 2017/0104964 | A1 * | 4/2017 | Graves | H04N 9/3129 |
| 2017/0363945 | A1 | 12/2017 | Graves et al. | |

FOREIGN PATENT DOCUMENTS

WO    WO-2008144673 A2 * 11/2008   ........... G03B 21/005

* cited by examiner

*Primary Examiner* — Christopher E Mahoney
(74) *Attorney, Agent, or Firm* — Patterson + Sheridan, LLP

(57)            ABSTRACT

A display system includes a display screen, where the display screen includes one or more transparent substrates, such as glass, plastic, or the like, a plurality of transparent adhesive pads, a plurality of white ink or adhesive deposits (e.g., a UV cured adhesive), a plurality of light absorbing material, such as black ink deposits, a plurality of gaskets, a color filter/mirror film, and a plurality of phosphors. The display screen may additionally include a thin anti-glare layer. The plurality of transparent adhesive pads and the thin anti-glare layer provide support to the plurality of phosphors, such that the plurality of phosphors are not in direct contact with the one or more transparent substrates and/or the color filter/mirror film. The plurality of white ink deposits may prevent light diffusion from one phosphor to another phosphor and the plurality of light absorbing material, such as black ink deposits, aids in increasing contrast between the phosphors.

17 Claims, 9 Drawing Sheets

VIEWER

100

108

A

104

106

114

112

B

104

102

110

460

418    416    406    408b    406    404    402

406    408c    406    420

406    408a    406

414    412    410    412    410

414    412    410    412    410

420

VIEWER

502

506

502

504

506

500

DISPLAY SCREEN

CROSS-REFERENCE TO RELATED APPLICATIONS

This application claims benefit of U.S. Provisional Patent Application Ser. No. 63/492,262, filed Mar. 27, 2023, which is herein incorporated by reference.

BACKGROUND

Field

Embodiments of the present disclosure generally relate to electronic display systems.

Description of the Related Art

Electronic display systems are commonly used to display information from computers and other sources. Typical display systems range in size from small displays used in mobile devices to very large displays, such as tiled displays, that are used to display large size images and video. Tiled display systems are generally made up of multiple smaller individual display devices, or "tiles," that are carefully aligned when assembled to provide a seamless and uniform appearance. In some embodiments, each tile may be a light-based electronic display device, such as a laser-phosphor display (LPD), including a self-contained laser-based image-generating system.

The tiles are oftentimes made of a protective front plane panel that is shared by, or common to, several image panel portions with each image panel portion being considered to be a tile. A plurality of phosphors are sandwiched between the front plane panel and the image panel portion. The tiles are oftentimes rolled up for shipping purposes. The tiles, collectively together as an image panel, should be as flat as possible and also should be in intimate contact to prevent the image artifacts. Furthermore, the phosphors that are used in a LPD system can be quite delicate and can be damaged.

Thus, there is a need in the art for an improved image panel.

SUMMARY

The present disclosure generally relates to electronic display systems. A display system includes a display screen, where the display screen includes one or more transparent substrates, such as glass, plastic, or the like, a plurality of transparent adhesive pads, a plurality of white ink or adhesive deposits (e.g., a UV cured adhesive), a plurality of light absorbing material, such as black ink, or adhesive deposits, a plurality of gaskets, a color filter/mirror film, and a plurality of phosphors. The display screen may additionally include a thin anti-glare layer. The plurality of transparent adhesive pads and the thin anti-glare layer all provide support to the plurality of phosphors, such that the plurality of phosphors are not in direct contact with the one or more transparent substrates and/or the color filter/mirror film. The plurality of white ink deposits may prevent light diffusion from one phosphor to another phosphor and the plurality of light absorbing material, such as black ink deposits, aids in increasing contrast between the phosphors.

In one embodiment, an image panel comprises: a color filter/mirror (CM) film; a plurality of phosphors disposed over the CM film; one or more adhesive pads disposed between the CM film and the plurality of phosphors; and a light absorbing material deposit disposed between adjacent phosphors of the plurality of phosphors.

In another embodiment, an image panel comprises: a first substrate; a plurality of phosphors disposed over the first substrate; a first ink deposit disposed between the first substrate and the plurality of phosphors, wherein the first ink deposit has a first surface facing the first substrate, and wherein the first ink deposit has a second surface opposite the first surface; a color filter/mirror (CM) film disposed over the plurality of phosphors and the first substrate; and a second ink deposit disposed between the first ink deposit and the CM film.

In another embodiment, an image panel comprises: a first substrate; a plurality of phosphors disposed over the first substrate; a first ink deposit disposed between the first substrate and the plurality of phosphors; a color filter/mirror (CM) film disposed over the plurality of phosphors and the first substrate; a second ink deposit disposed between the first ink deposit and the CM film; a first adhesive pad disposed between the second ink deposit and the CM film; and a second substrate disposed on the CM film.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to electronic display systems. A display system includes a display screen, where the display screen includes one or more transparent substrates, such as glass, plastic, or the like, a plurality of transparent adhesive pads, a plurality of white ink or adhesive deposits (e.g., a UV cured adhesive), a plurality of light absorbing material, such as black ink deposits, a plurality of gaskets, a color filter/mirror film, and a plurality of phosphors. The display screen may additionally include a thin anti-glare layer. The plurality of transparent adhesive pads and the thin anti-glare layer provide support to the plurality of phosphors, such that the plurality of phosphors are not in direct contact with the one or more transparent substrates and/or the color filter/mirror film. The plurality of white ink deposits may prevent light diffusion from one phosphor to another phosphor and the plurality of light absorbing material, such as black ink deposits, aids in increasing contrast between the phosphors.

Figure 1:
FIG. 1 is a perspective schematic diagram of a display system, according to certain embodiments.

FIG. 1 is a perspective schematic diagram of a display system 100, according to certain embodiments. Display system 100 is a light-based electronic display device configured to produce video and static images for a viewer 106. The display system 100 includes light-emitting phosphors 104 disposed between two planes. For example, display system 100 may be a LPD or other phosphor-based display device. While shown as a single image panel 102 in FIG. 1, it is to be understood that the image panel 102 may include a plurality of image panels seamlessly coupled together. For example, the image panel 102 may comprise one or more protective front plane panels and one or more image panel portions with a plurality of phosphors 104 coupled therebetween. FIG. 1 shows a plurality of phosphors 104 extending from the top 108 of the image panel 102 to the bottom 110 of the image panel 102.

The display system 100 includes a light source 112, such as a laser module, that is used to produce one or more scanning light beams 114, such as laser beams, to excite the phosphors 104 in image panel 102. The phosphors 104 are stripes that are made up of alternating phosphor material of different colors, e.g., red, green, and blue, where the colors are selected so that they can be combined to form white light and other colors of light. Scanning light beam 114 is a modulated light beam that includes optical pulse width and/or amplitude variable pulses that carry image information and is scanned across image panel 102 along two orthogonal directions, e.g., horizontally (parallel to arrow A) and vertically (parallel to arrow B), in a raster scanning pattern to produce an image on image panel 102 for viewer 106. In some embodiments, scanning light beam 114 includes visible lasers beams of one or more colors that discretely illuminate individual subpixels of the phosphors 104 to produce an image. The scanning light beam 114 can be of a specific width and height, so as to excite only a specific phosphor 104 or group of phosphors 104 at one time, such as a scanning laser beam, which is approximately 700 μm tall and approximately 100 μm wide. A feedback control alignment mechanism can be provided in the display system 100 to maintain proper alignment of the scanning beam 114 on the desired sub-pixel to achieved desired image quality.

Figure 2:
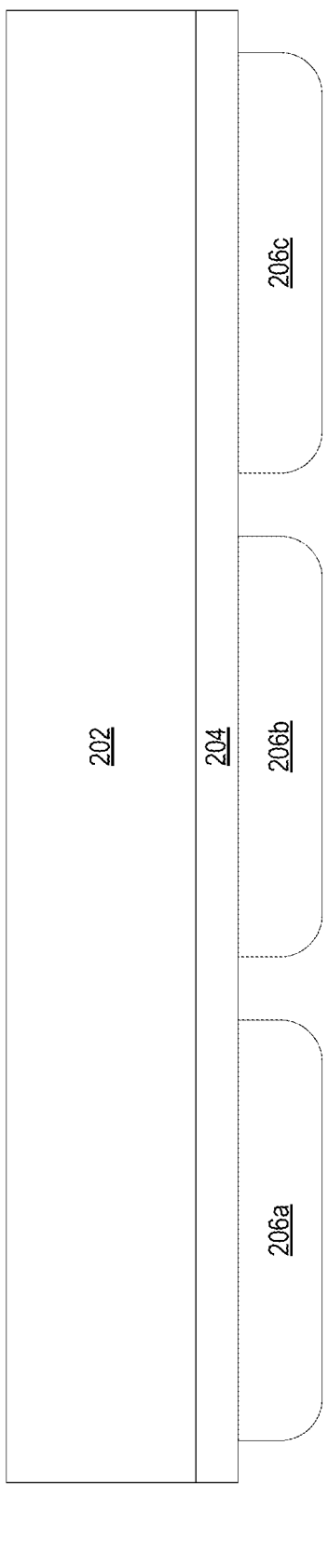
FIG. 2 is a cross-sectional view of an image panel having a substrate, according to certain embodiments.

FIG. 2 is a cross-sectional view of an image panel 200 having a substrate 202, according to certain embodiments. The terms image panel and display screen are used interchangeably throughout the disclosure. The image panel 200 may be the single image panel 102 of FIG. 1. The image panel 200 includes a plurality of phosphors 206a, 206b, 206c separated from the substrate 202 by an air gap 204. The plurality of phosphors 206a, 206b, 206c are an alternating pattern, where each of the plurality of phosphors 206a, 206b, 206c comprises a phosphor material of a different color (e.g., red, green, blue). For example, a first phosphor 206a may have a first phosphor material showing a color of red, a second phosphor 206b may have a second phosphor material showing a color of green, and a third phosphor 206c may have a third phosphor material showing a color of blue. Although three phosphors of the plurality of phosphors 206a, 206b, 206c are shown for simplification purposes, more than the depicted number of phosphors are contemplated and applicable to the embodiments herein.

The substrate 202 may be any transparent material applicable to electronic display systems. For example, the substrate 202 may be glass (e.g., tempered glass, etc.), plastic (e.g., polyethylene terephthalate (PET), thermoplastic polyurethane (TPU), polyethylene terephthalate glycol-modified (PETG), polycarbonates, etc.), or the like. PETG plastics may have a thermal expansion or CTE less than that of polycarbonates and also may be more flexible and have greater impact resistance than that of PET plastics. The substrate 202 may have a thickness of about 1 mm, however, the substrate 202 thickness may be between a range of 0.5 mm to about 3 mm. In some examples, the substrate 202 may be thicker than 3 mm. Furthermore, the air gap 204 may have a thickness less than the thickness of the substrate 202. The air gap 204 separates the plurality of phosphors 206a, 206b, 206c from the substrate 202 so that the plurality of phosphors 206a, 206b, 206c are not in contact with the substrate 202.

Figure 3A:
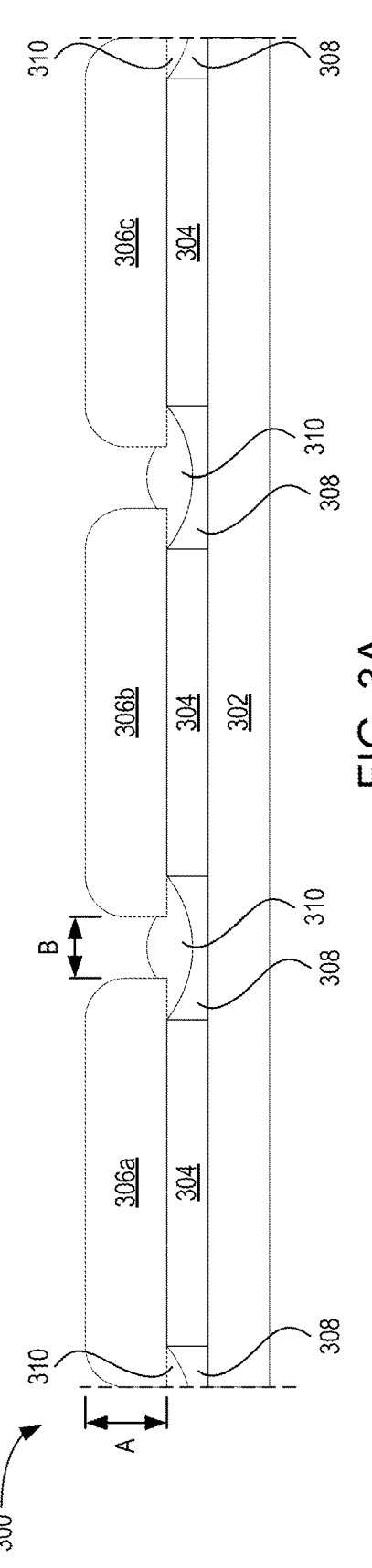
FIG. 3A is a cross-sectional view of an image panel, according to certain embodiments.

FIG. 3A is a schematic illustration of an image panel 300, according to certain embodiments. The image panel 300 may be the single image panel 102 of FIG. 1 or a multi-image panel having an transparent all glass or plastic substrate or a transparent partial glass or plastic substrate. The image panel 300 includes a color filter/mirror film (CM) 302, a plurality of transparent adhesive pads 308 disposed on the CM 302, a plurality of light absorbing material, such as black ink deposits, 310, and a plurality of phosphors 306a, 306b, 306c. The CM 302 may be a 3M UV transmittance film, a visible light reflector film, or the like. The dashed line indicates that additional repeating structures may be present in the embodiments described. The plurality of adhesive pads may be a transparent glue or resin.

Each transparent adhesive pads of the plurality of transparent adhesive pads 308 may be located equidistant from each other. Furthermore, each transparent adhesive pads of the plurality of transparent adhesive pads 308 has a first side and a second side opposite of the first side. The first side is in contact with the CM 302 and the second side is concave. The first side and the second side are coupled via a third side and a fourth side, where the third side is opposite of the fourth side. A phosphor of the plurality of phosphors 306a,

306*b*, 306*c* is located at the intersection of the second side and the third side and a different phosphor of the plurality of phosphors 306*a*, 306*b*, 306*c* is located at the intersection of the second side and the fourth side.

Thus, the plurality of phosphors 306*a*, 306*b*, 306*c* are suspended by the plurality of transparent adhesive pads 308 and not in direct contact with the CM 302. Rather, an air gap 304 is located between the plurality of phosphors 306*a*, 306*b*, 306*c* and the CM 302. A light absorbing material, such as black ink deposit, of the plurality of light absorbing material 310 is disposed on each transparent adhesive pad of the plurality of transparent adhesive pads 308. The plurality of light absorbing materials 310 generates a contrast between the plurality of phosphors 306*a*, 306*b*, 306*c*, which may result in greater color perception. The spacing "B" between the plurality of phosphors 306*a*, 306*b*, 306*c* may be between about 45 μm and about 75 μm, such as about 60 μm.

Furthermore, each phosphor of the plurality of phosphors 306*a*, 306*b*, 306*c* has a height "A" of between about 30 μm and about 60 μm, such as about 45 μm. After the plurality of light absorbing materials 310 are deposited between the plurality of phosphors 306*a*, 306*b*, 306*c*, such that an area between each transparent adhesive pad and the adjacent phosphors is filled with light absorbing materials, the light absorbing materials are cured using ultraviolet (UV) light. When the light absorbing material is cured, the light absorbing material hardens into a solid structure. The side of the light absorbing material opposite of the side contacting the transparent adhesive pad may be concave due to surface tension. In one embodiment, it is contemplated that black adhesive may be used instead of light absorbing material. In yet another embodiment, it is contemplated that black paint may be used instead of light absorbing material.

Figure 3B:
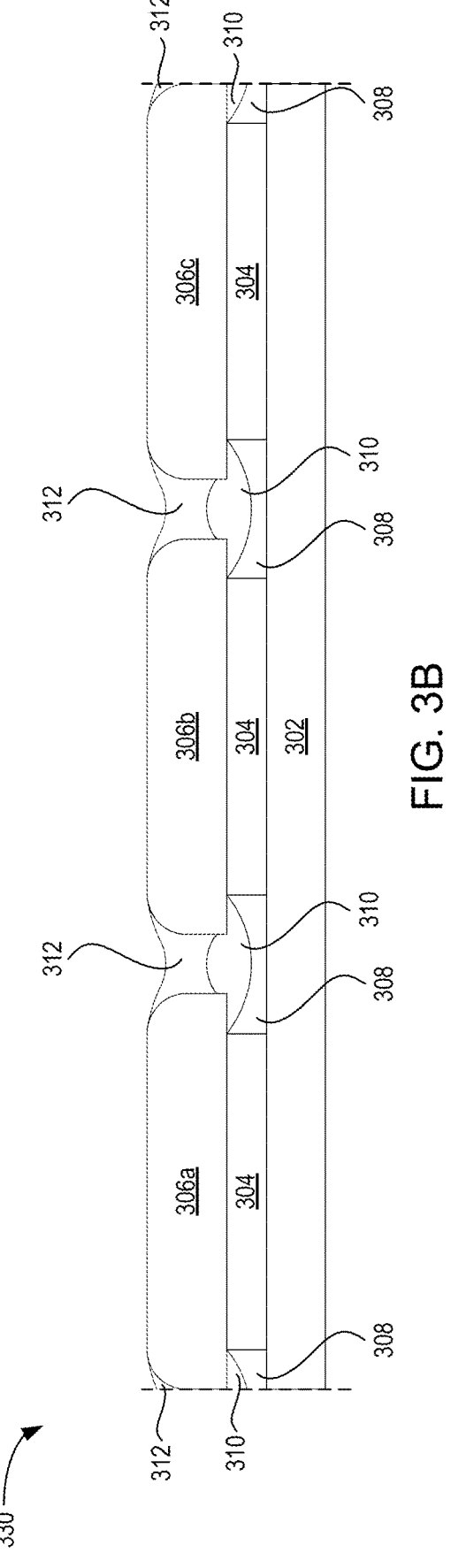
FIG. 3B is a cross-sectional view of an image panel, according to certain embodiments.

FIG. 3B is a cross-sectional view of an image panel 330, according to certain embodiments. The image panel 330 may be a modification of the image panel 300 of FIG. 3A. For simplification purposes, common elements of the image panel 330 and the image panel 300 are denoted with the same reference numerals. When compared to the image panel 300, the image panel 330 further includes a plurality of white ink deposits 312, where a white ink deposit of the plurality of white ink deposits 312 is deposited on each of the light absorbing materials of the plurality of light absorbing materials 310. Furthermore, the plurality of white ink deposits 312 may be deposited to a level equal or almost equal to a top side of the plurality of phosphors 306*a*, 306*b*, 306*c*, where the top side is opposite of the side of the phosphor contacting the air gap 304. The plurality of white ink deposits 312 may be white paint, in some examples. Furthermore, the plurality of white ink deposits 312 prevents light diffusion or excitation of one phosphor due to an excitation light from an adjacent phosphor. As shown in FIG. 3B, the white ink deposits 312 have a concave surface opposite the surface contacting the light absorbing material 310.

The plurality of white ink deposits 312 are cured via UV light, where the plurality of white ink 312 deposits may be deposited after the plurality of light absorbing materials 310 are cured. In another example, the plurality of light absorbing materials 310 and the plurality of white ink deposits 312 have a difference in density or surface tension, which causes the plurality of light absorbing materials 310 and the plurality of white ink deposits 312 to not mix. Thus, the plurality of light absorbing materials 310 and the plurality of white ink deposits 312 may be cured via UV light in the same step. In one embodiment, it is contemplated that white adhesive may be used instead of white ink. In yet another embodiment, it is contemplated that white paint may be used instead of white ink.

Figure 3C:
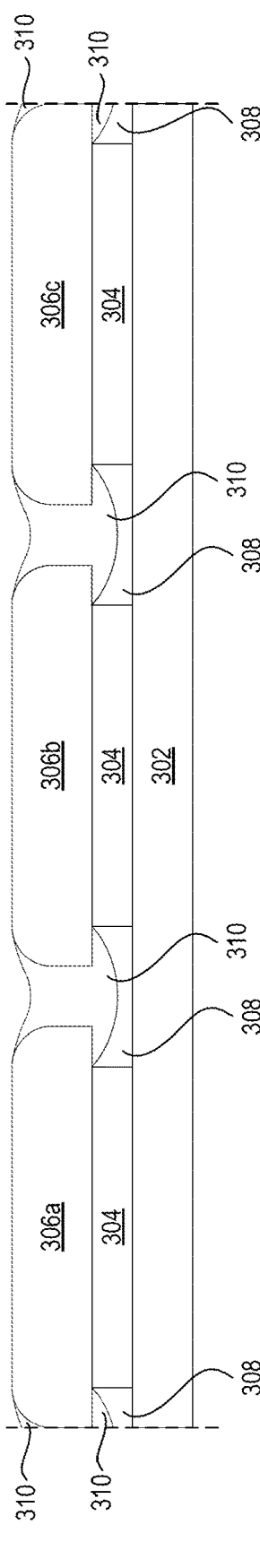
FIG. 3C is a cross-sectional view of an image panel, according to certain embodiments.

FIG. 3C is a cross-sectional view of an image panel 360, according to certain embodiments. The image panel 360 may be a modification of the image panel 330 of FIG. 3B. For simplification purposes, common elements of the image panel 360 and the image panel 330 are denoted with the same reference numerals. Rather than depositing the plurality of white ink deposits 312 on the plurality of light absorbing materials 310 as shown in the image panel 330, the plurality of light absorbing materials 310 are deposited to a level equal or almost equal to a top side of the plurality of phosphors 306*a*, 306*b*, 306*c*, where the top side is opposite of the side of the phosphor contacting the air gap 304. Thus, the plurality of white ink deposits 312 of the image panel 360 may not be needed.

Figure 4A:
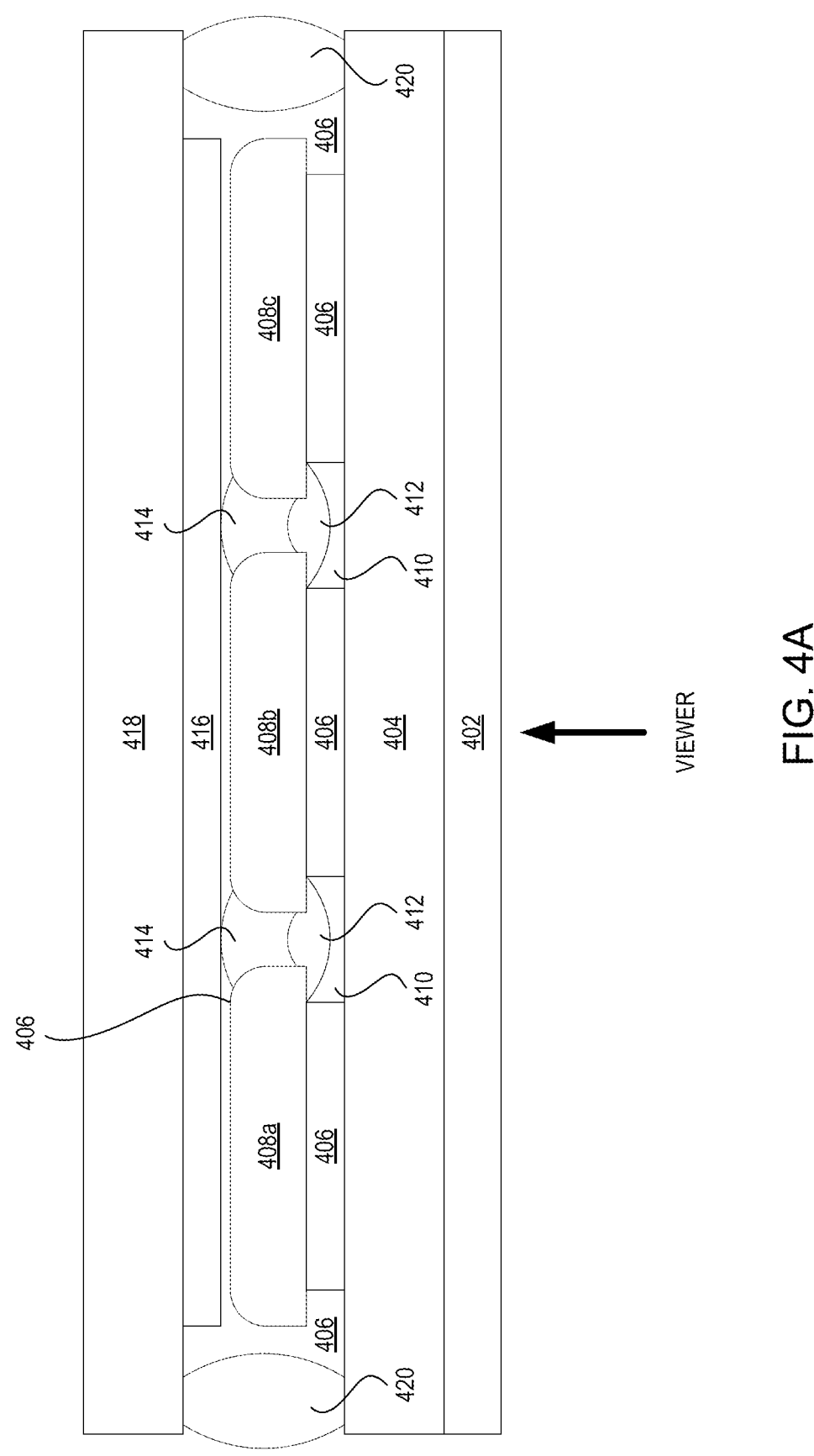
FIG. 4A is a cross-sectional view of an image panel, according to certain embodiments.

FIG. 4A is a cross-sectional view of an image panel 400, according to certain embodiments. The image panel 400 may be the single image panel 102 of FIG. 1 or a multi-image panel having a transparent all glass or plastic substrate or a transparent partial glass or plastic substrate. Looking inwards from the "viewer," the image panel 400 includes a functional layer 402, a first substrate 404 adjacent to the functional layer 402, a plurality of transparent adhesive pads 410 disposed on the first substrate 404, and a plurality of phosphors 408*a*, 408*b*, 408*c* disposed in an alternating fashion adjacent to the plurality of transparent adhesive pads 410, where the plurality of phosphors 408*a*, 408*b*, 408*c* is suspended by the plurality of transparent adhesive pads 410 such that an air gap 406 is between the plurality of phosphors 408*a*, 408*b*, 408*c* and the first substrate 404. It is to be understood that more than the depicted number of phosphors is contemplated, and the depicted number of phosphors is for exemplary and simplification purposes.

Each transparent adhesive pads of the plurality of transparent adhesive pads 410 may be located equidistant from each other. Furthermore, each transparent adhesive pads of the plurality of transparent adhesive pads 410 has a first side and a second side opposite of the first side. The first side is in contact with the first substrate 404 and the second side is concave. The first side and the second side are coupled via a third side and a fourth side, where the third side is opposite of the fourth side. A phosphor of the plurality of phosphors 408*a*, 408*b*, 408*c* is located at the intersection of the second side and the third side and a different phosphor of the plurality of phosphors 408*a*, 408*b*, 408*c* is located at the intersection of the second side and the fourth side. Thus, each of the plurality of phosphors 408*a*, 408*b*, 408*c* and each of the plurality of transparent adhesive pads 410 are adjacent and alternating. A portion of each phosphor overlaps an adjacent transparent adhesive pad, where the portion may be a small percent of the bottom region (i.e., the region opposite the first substrate 404) of the phosphor.

The functional layer 402 may be a dual bandpass filter (e.g., 405/NIR Block), a color correction film, an anti-shatter film, an anti-glare (AG) layer, an AFPL film, an antimicrobial layer, or the like. It is to be understood that the functional layer 402 may be more than one layer and may include a combination of any of the previously mentioned functional layer materials. The first substrate 404 may be glass (e.g., tempered glass, etc.), plastic (e.g., polyethylene terephthalate (PET), thermoplastic polyurethane (TPU), polycarbonates, polyethylene terephthalate glycol-modified (PETG), etc.), or the like. PETG plastics may have a thermal expansion or CTE less than that of polycarbonates and also may be more flexible and have greater impact resistance than that of PET plastics.

The image panel 400 further includes a plurality of light absorbing materials, such as black ink deposits, 412 disposed on the plurality of transparent adhesive pads 410 and between the plurality of phosphors 408*a*, 408*b*, 408*c*. A plurality of white ink deposits 414 are disposed on the plurality of light absorbing materials 412 and between the plurality of phosphors 408*a*, 408*b*, 408*c*, where the plurality of white ink deposits 414 extends past a top edge of the plurality of phosphors 408*a*, 408*b*, 408*c*. In some examples, the portion of the plurality of white ink deposits 414 that extends past the top edge of the plurality of phosphors 408*a*, 408*b*, 408*c* may be a transparent material that is an ink, glue, paint, or the like. In other examples, the plurality of white ink deposits 414 does not extend past the top edge of the plurality of phosphors 408*a*, 408*b*, 408*c*. In such examples, a CM 416 may be disposed adjacent to the top edge of the plurality of phosphors 408*a*, 408*b*, 408*c* without being in contact with the plurality of phosphors 408*a*, 408*b*, 408*c* due to the non-planarity of the CM 416.

Because the plurality of white ink deposits 414 extends past the top edge of the plurality of phosphors 408*a*, 408*b*, 408*c*, an air gap 406 between the CM 416 and the plurality of phosphors 408*a*, 408*b*, 408*c* is achieved. In some examples, the plurality of white ink deposits 414 may actually be the plurality of light absorbing materials 412. A second substrate 418 is disposed adjacent to the CM 416. The second substrate 418 may be glass (e.g., tempered glass, etc.), plastic (e.g., polyethylene terephthalate (PET), thermoplastic polyurethane (TPU), polyethylene terephthalate glycol-modified (PETG), polycarbonates, etc.), or the like. The first substrate 404 and the second substrate 418 may be the same material or may be different materials.

A plurality of gaskets 420 are located on both sides of the image panel 400, where the plurality of gaskets 420 couples the first substrate 404 to the second substrate 418. The plurality of gaskets 420 may be used to seal the innards of the image panel 400, such that moisture, dust, pollen, and the like may not enter the area formed by the first substrate 404, the second substrate 418 and the plurality of gaskets 420. The plurality of gaskets 420 are adhered to the first substrate 404 and the second substrate 418 with double sided vacuum tape. Thus, thus the area may be hermetically sealed and/or vacuum sealed.

Figure 4B:
FIG. 4B is a cross-sectional view of an image panel, according to certain embodiments.

FIG. 4B is a cross-sectional view of an image panel 430, according to certain embodiments. The image panel 430 may be a modification of the image panel 400 of FIG. 4A. For simplification purposes, common elements of the image panel 430 and the image panel 400 are denoted with the same reference numerals. Looking inwards from the "viewer," the image panel 430 includes the functional layer 402, the first substrate 404 adjacent to the functional layer 402, a thin AG layer 422 disposed between the first substrate 404 and the plurality of phosphors 408*a*, 408*b*, 408*c*. It is to be understood that more than the depicted number of phosphors is contemplated, and the depicted number of phosphors is for exemplary and simplification purposes.

The thin AG layer 422 prevents optical contact between the first substrate 404 and the plurality of phosphors 408*a*, 408*b*, 408*c*. The thin AG layer 422 may have a structure that has enough non-planarity to cause the thin AG layer to not come in contact with the plurality of phosphors 408*a*, 408*b*, 408*c*. In some examples, the thin AG layer 422 may have a thickness of between about 1 μm and about 15 μm. The plurality of phosphors 408*a*, 408*b*, 408*c* are disposed adjacent to the thin AG layer 422, where a space between the plurality of phosphors 408*a*, 408*b*, 408*c* may be filled with the plurality of deposits 434 that function as a barrier to cross-talk that may happen with a transparent layer, and also as a reflective surface that enhances recycling within the cavity. An example of the deposits is white ink. In some examples, the plurality of deposits 434 may actually be the plurality of light absorbing materials 412. The plurality of deposits 434 and the plurality of light absorbing materials 412 may be deposited using a print method or a squeegee method and cured using UV light. Furthermore, the cured structure may be used as a base for additional layers of phosphors, black ink deposits, and white ink deposits.

The plurality of light absorbing materials 412 are disposed on the plurality of white ink deposits, where the plurality of transparent adhesive pads 410 is between the plurality of light absorbing materials 412 and the CM 416. The plurality of transparent adhesive pads 410 are disposed in an alternating fashion adjacent to the plurality of transparent adhesive pads 410, where the plurality of phosphors 408*a*, 408*b*, 408*c* is suspended by the plurality of transparent adhesive pads 410 such that the air gap 406 is between the plurality of phosphors 408*a*, 408*b*, 408*c* and the CM 416. The CM 416 is disposed adjacent to the second substrate 418.

The plurality of gaskets 420 are located on both sides of the image panel 400, where the plurality of gaskets 420 couples the first substrate 404 to the second substrate 418. The plurality of gaskets 420 may act as a standoff between the first substrate 404 and the second substrate 418 in order to keep the plurality of phosphors 408*a*, 408*b*, 408*c* from touching the first substrate 404 and/or the second substrate 418. Thus, the plurality of gaskets 420 may effectively create the air gap 406. The plurality of gaskets 420 may be used to seal the innards of the image panel 430, such that moisture, dust, pollen, and the like may not enter the area formed by the first substrate 404, the second substrate 418 and the plurality of gaskets 420. The plurality of gaskets 420 are adhered to the first substrate 404 and the second substrate 418 with double sided vacuum tape. Thus, thus the area may be hermetically sealed and/or vacuum sealed.

Figure 4C:
FIG. 4C is a cross-sectional view of an image panel, according to certain embodiments.

FIG. 4C is a cross-sectional view of an image panel 460, according to certain embodiments. The image panel 460 may be a modification of the image panel 430 of FIG. 4B. For simplification purposes, common elements of the image panel 460 and the image panel 430 are denoted with the same reference numerals. Rather than including the thin AG layer 422, such as in the image panel 430, the image panel 460 includes the plurality of transparent adhesive pads 410 disposed on the first substrate 404 in a location opposite of the plurality of transparent adhesive pads 410 disposed on the CM 416. The plurality of light absorbing materials 412 are deposited on the plurality of transparent adhesive pads 410 disposed on the first substrate 404, where a plurality of white ink deposits 414 is deposited between the plurality of light absorbing materials 412. The plurality of white ink deposits 414 and the plurality of light absorbing materials 412 may be deposited using a print method or a squeegee method and cured using UV light. In some examples, the plurality of white ink deposits 414 may actually be the plurality of light absorbing materials 412.

Figure 5:
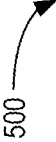
FIG. 5 is a schematic illustration of an image panel assembly, according to certain embodiments.

FIG. 5 is a schematic illustration of an image panel assembly 500, according to certain embodiments. The image panel assembly 500 includes a base layer 502, where a phosphor layer 504 is disposed on the base layer 502, and a substrate layer 506 disposed on the phosphor layer 504. The phosphor layer 504 includes stripes of phosphors in alternating phosphor colors. Likewise, the substrate layer 506 may be glass (e.g., tempered glass, etc.), plastic (e.g., PET, TPU, PETG, polycarbonates, etc.), or the like. The base layer 502 may be a mold for fabricating an image panel, such as any of the image panels 300, 330, 360, 400, 430, 460 previously described.

The phosphor layer 504 is disposed on the base layer 502, where the phosphor layer 504 includes cured black ink disposed between the phosphors, such as in the arrangement shown in the image panels 300, 330, 360, 400, 430, 460, and uncured transparent adhesive pads disposed adjacent the cured light absorbing material, such as black ink, where the uncured transparent adhesive pads may be the plurality of transparent adhesive pads 308, 410 of FIGS. 3A-3C and 4A-4C or a clear resin. The substrate layer 506 may have a thickness of about 1 mm, but may be between a range of 0.5 mm and about 3 mm. It is contemplated that other substrate layer 506 thicknesses are applicable to the embodiments described. The substrate layer 506 is laid on the uncured transparent adhesive pads and laminated to the phosphor layer using a pressure roller. The uncured transparent adhesive pads are cured using UV light. Afterwards, the combined phosphor layer 504 and the substrate layer 506 is removed from the base layer 502 to form an image panel, such as any of the image panels 300, 330, 360, 400, 430, 460 previously described.

Figure 6:
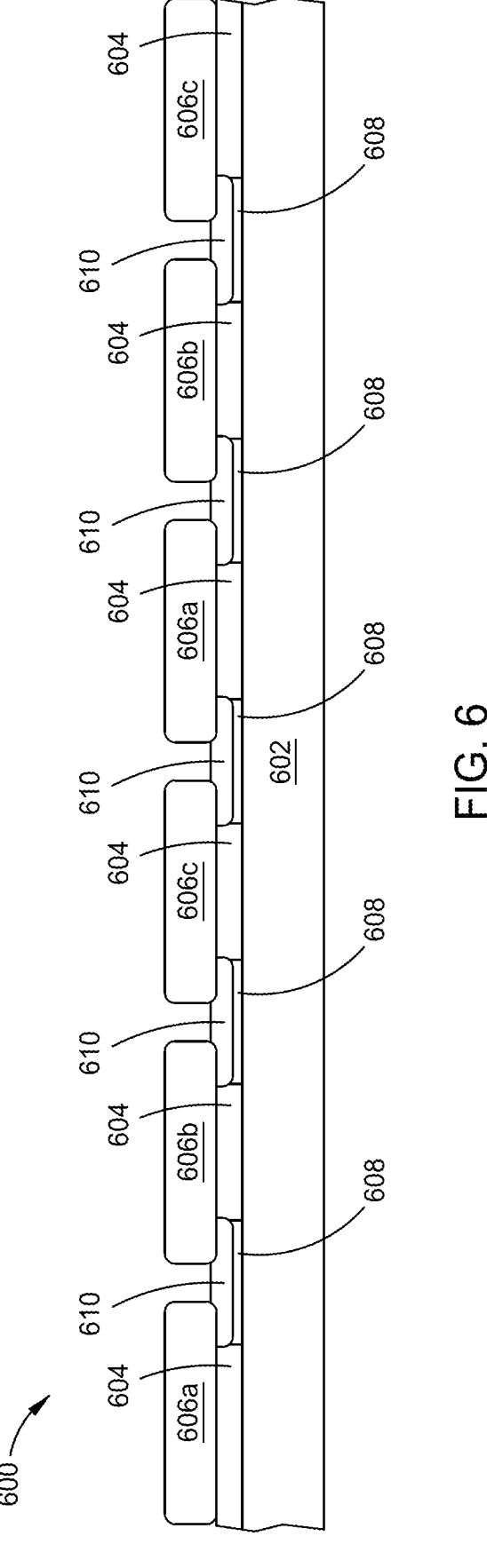
FIG. 6 is a cross-sectional view of an image panel, according to certain embodiments.

FIG. 6 is a cross-sectional view of an image panel 600, according to certain embodiments. The image panel 600 may be the single image panel 102 of FIG. 1 or a multi-image panel having an transparent all glass or plastic substrate or a transparent partial glass or plastic substrate. The image panel 600 includes a color filter/mirror film (CM) 602, a plurality of transparent adhesive pads 608 disposed on the CM 602, a plurality of light absorbing material, such as black ink deposits, 610, and a plurality of phosphors 606a, 606b, 606c. The CM 602 may be a 3M UV transmittance film, a visible light reflector film, or the like. The dashed line indicates that additional repeating structures may be present in the embodiments described. The plurality of adhesive pads may be a transparent glue or resin.

Each transparent adhesive pads of the plurality of transparent adhesive pads 608 may be located equidistant from each other. Furthermore, each transparent adhesive pads of the plurality of transparent adhesive pads 608 has a first side and a second side opposite of the first side. The first side is in contact with the CM 602 and the second side is concave. The first side and the second side are coupled via a third side and a fourth side, where the third side is opposite of the fourth side. A phosphor of the plurality of phosphors 606a, 606b, 606c is located at the intersection of the second side and the third side and a different phosphor of the plurality of phosphors 606a, 606b, 606c is located at the intersection of the second side and the fourth side.

Thus, the plurality of phosphors 606a, 606b, 606c are suspended by the plurality of transparent adhesive pads 608 and not in direct contact with the CM 602. Rather, an air gap 604 is located between the plurality of phosphors 606a, 606b, 606c and the CM 602. A black ink deposit of the plurality of light absorbing materials 610 is disposed on each transparent adhesive pad of the plurality of transparent adhesive pads 608. The plurality of light absorbing materials 610 generates a contrast between the plurality of phosphors 606a, 606b, 606c, which may result in greater color perception.

After the plurality of light absorbing materials 610 are deposited between the plurality of phosphors 606a, 606b, 606c, such that an area between each transparent adhesive pad and the adjacent phosphors is filled with light absorbing material, such as black ink, the light absorbing material is cured using ultraviolet (UV) light. When the light absorbing material is cured, the light absorbing material hardens into a solid structure. The side of the light absorbing material opposite of the side contacting the transparent adhesive pad may be concave due to surface tension. In one embodiment, it is contemplated that black adhesive may be used instead of light absorbing material. In yet another embodiment, it is contemplated that black paint may be used instead of light absorbing material.

By filling an area between each of the phosphors with white ink deposits and/or light absorbing materials, greater image quality may be achieved.

In one embodiment, an image panel comprises: a color filter/mirror (CM) film; a plurality of phosphors disposed over the CM film; one or more adhesive pads disposed between the CM film and the plurality of phosphors; and a black ink deposit disposed between adjacent phosphors of the plurality of phosphors. The one or more adhesive pads comprises a plurality of adhesive pads and wherein the plurality of adhesive pads are located equidistant from each other. The plurality of phosphors are spaced from the CM film by an air gap. The plurality of phosphors are not in direct contact with the CM film. The one or more adhesive pads have a first side in contact with the CM film, wherein the one or more adhesive pads have a second side opposite the first side, wherein the one or more adhesive pads have a third side and a fourth side coupling the first side and second side, wherein the third side is opposite the fourth side, and wherein the second side is concave. A first phosphor of the plurality of phosphors is located at an intersection of the second side and the third side. A second phosphor of the plurality of phosphors is located at an intersection of the second side and the fourth side. The black ink deposit comprises black adhesive. The black ink deposit comprises black paint. The image panel further comprises white ink deposits on each black ink deposit. A top side of the plurality of phosphors is equal to a top of the white ink deposits. Each white ink deposit comprises a first surface in contact with a corresponding black ink deposit, wherein each white ink deposit comprises a second surface opposite the first surface, and wherein the second surface is concave.

In another embodiment, an image panel comprises: a first substrate; a plurality of phosphors disposed over the first substrate; a first ink deposit disposed between the first substrate and the plurality of phosphors, wherein the first ink deposit has a first surface facing the first substrate, and wherein the first ink deposit has a second surface opposite the first surface; a color filter/mirror (CM) film disposed over the plurality of phosphors and the first substrate; and a second ink deposit disposed between the first ink deposit and the CM film. The second surface is concave. The first ink deposit is a black ink deposit. The image panel further comprises a second substrate disposed on the CM film.

In another embodiment, an image panel comprises: a first substrate; a plurality of phosphors disposed over the first substrate; a first ink deposit disposed between the first substrate and the plurality of phosphors; a color filter/mirror (CM) film disposed over the plurality of phosphors and the first substrate; a second ink deposit disposed between the first ink deposit and the CM film; a first adhesive pad disposed between the second ink deposit and the CM film; and a second substrate disposed on the CM film. The image panel further comprises an Ag layer disposed between the first substrate and plurality of phosphors, and wherein the plurality of phosphors are in contact with the Ag layer. The image panel further comprises a third ink deposit and a second adhesive pad, wherein the third ink deposit is disposed between the first ink deposit and the first substrate. The second adhesive pad is disposed between the third ink deposit and the first substrate.

While the foregoing is directed to embodiments of the present disclosure, other and further embodiments of the disclosure may be devised without departing from the basic scope thereof, and the scope thereof is determined by the claims that follow.

What is claimed is:

1. An image panel, comprising:
a color filter/mirror (CM) film;
a plurality of phosphors disposed over the CM film;
one or more adhesive pads disposed between the CM film and the plurality of phosphors;
a light absorbing material disposed between adjacent phosphors of the plurality of phosphors; and
white ink deposits on each light absorbing material.

2. The image panel of claim 1, wherein the one or more adhesive pads comprises a plurality of adhesive pads and wherein the plurality of adhesive pads are located equidistant from each other.

3. The image panel of claim 1, wherein the plurality of phosphors are spaced from the CM film by an air gap.

4. The image panel of claim 3, wherein the plurality of phosphors are not in direct contact with the CM film.

5. The image panel of claim 1, wherein the one or more adhesive pads have a first side in contact with the CM film, wherein the one or more adhesive pads have a second side opposite the first side, wherein the one or more adhesive pads have a third side and a fourth side coupling the first side and second side, wherein the third side is opposite the fourth side, and wherein the second side is concave.

6. The image panel of claim 5, wherein a first phosphor of the plurality of phosphors is located at an intersection of the second side and the third side.

7. The image panel of claim 5, wherein a second phosphor of the plurality of phosphors is located at an intersection of the second side and the fourth side.

8. The image panel of claim 1, wherein the light absorbing material comprises black ink.

9. The image panel of claim 1, wherein the light absorbing material comprises black paint or black adhesive.

10. The image panel of claim 1, wherein a top side of the plurality of phosphors is equal to a top of the white ink deposits.

11. The image panel of claim 1, wherein each white ink deposit comprises a first surface in contact with a corresponding black ink deposit, wherein each white ink deposit comprises a second surface opposite the first surface, and wherein the second surface is concave.

12. An image panel, comprising:
a first substrate;
a plurality of phosphors disposed over the first substrate;
a first ink deposit disposed between the first substrate and the plurality of phosphors, wherein the first ink deposit has a first surface facing the first substrate, and wherein the first ink deposit has a second surface opposite the first surface;
a color filter/mirror (CM) film disposed over the plurality of phosphors and the first substrate; and
a second ink deposit disposed between the first ink deposit and the CM film, wherein the second surface is concave.

13. The image panel of claim 12, further comprising a second substrate disposed on the CM film.

14. An image panel, comprising:
a first substrate;
a plurality of phosphors disposed over the first substrate;
a first ink deposit disposed between the first substrate and the plurality of phosphors, wherein the first ink deposit has a first surface facing the first substrate, and wherein the first ink deposit has a second surface opposite the first surface;
a color filter/mirror (CM) film disposed over the plurality of phosphors and the first substrate; and
a second ink deposit disposed between the first ink deposit and the CM film, wherein the first ink deposit is a black ink deposit.

15. An image panel, comprising:
a first substrate;
a plurality of phosphors disposed over the first substrate;
a first ink deposit disposed between the first substrate and the plurality of phosphors;
a color filter/mirror (CM) film disposed over the plurality of phosphors and the first substrate;
a second ink deposit disposed between the first ink deposit and the CM film;
a first adhesive pad disposed between the second ink deposit and the CM film; and
a second substrate disposed on the CM film; and
a third ink deposit and a second adhesive pad, wherein the third ink deposit is disposed between the first ink deposit and the first substrate.

16. The image panel of claim 15, further comprising an Ag layer disposed between the first substrate and plurality of phosphors, and wherein the plurality of phosphors are in contact with the Ag layer.

17. The image panel of claim 15, wherein the second adhesive pad is disposed between the third ink deposit and the first substrate.

* * * * *